(12) United States Patent
Mihalak

(10) Patent No.: US 6,321,875 B1
(45) Date of Patent: Nov. 27, 2001

(54) WHEEL BEARING LUBRICATOR SLEEVE

(76) Inventor: Kevin Mihalak, 175 S. Main St., Albion, PA (US) 16401

( * ) Notice: Subject to any disclaimer, the term of this patent is extended or adjusted under 35 U.S.C. 154(b) by 0 days.

(21) Appl. No.: 09/427,460

(22) Filed: Oct. 21, 1999

(51) Int. Cl.$^7$ ............................................. F16C 1/24
(52) U.S. Cl. .................................. 184/5.1; 184/105.2
(58) Field of Search ........................ 184/5.1, 105.2; 222/256, 330

(56) References Cited

U.S. PATENT DOCUMENTS

| | | | |
|---|---|---|---|
| 2,369,178 | * | 2/1945 | Richmond et al. ............... 184/5.1 |
| 4,928,794 | * | 5/1990 | Bangerger ......................... 184/5.1 |
| 4,932,499 | | 6/1990 | Covert . |
| 5,080,198 | | 1/1992 | Rice . |
| 5,109,955 | * | 5/1992 | Clark ............................. 184/105.2 |
| 5,232,069 | | 8/1993 | Siegrist . |
| 5,307,901 | | 5/1994 | Stromberg . |
| 5,584,359 | | 12/1996 | Reinersman . |
| 5,782,318 | * | 7/1998 | NG .................................. 184/5.1 |

* cited by examiner

*Primary Examiner*—David Fenstermacher
(74) *Attorney, Agent, or Firm*—Kenneth W. Wargo

(57) ABSTRACT

A wheel bearing lubrication sleeve, including a sleeve body and a handle attached thereto. The sleeve body further comprises a shoulder, a sealing ring, a guide shaft, and an angular grease passage with an entrance at the shoulder and an exit at the sealing ring. The device is Inserted into the inner bore of a typical automobile wheel hub until seated on the shoulder after the hub has been removed from the vehicle. When the device has been inserted into the wheel hub, grease can be introduced into the entrance of the grease passage and communicated through the passage to the wheel bearings within the hub, thereby allowing the bearings to be repacked with grease quickly and easily.

7 Claims, 4 Drawing Sheets

WHEEL BEARING LUBRICATOR SLEEVE

BACKGROUND OF THE INVENTION

1. Field of the Invention

This invention relates to a device for lubricating wheel bearings for motor vehicles, and will be particularly useful in lubricating wheel bearings In racing car applications.

2. Description of the Prior Art

Many automobiles and light trucks are constructed using an axle and wheel hub assembly for mounting the wheels of the vehide. Typically, the wheel hub includes two Interior sets of roller bearings to receive the axle and allow the wheel hub to freely rotate about the axle. The two sets of bearings, one outer and one inner, are housed in a bore within the hub. The outer bearings are those located on the side of the hub on which the wheel is mounted, while the inner bearings are on the opposing side of the hub. The bearing sets are packed with grease and then covered with a seal to keep unwanted foreign material out. Periodically, the bearing sets need to be repacked with grease to facilitate optimal performance. In racing applications the high demand placed on the bearings makes it even more rtnt that frequent repacking be done.

There have been numerous inventions related to devices to aid in lubricating or repacking grease into these types of wheel bearings. Some examples include those found at U.S. Pat. Nos. 4,058,185; 4,106,826; 4,932,499; 5,080,198; 5,109,955; 5,307,901; and 5,584,359.

The present invention is directed specifically to the inner set of bearings on a typical wheel hub assembly. A good example of this type of hub is the wilwood Starilght V, which is often used in racecars. The inner bearings of the wheel hub present particular problems with respect to the grease packing process. To pack the inner bearings with grease, the usual procedure Is to take the hub off the vehicle, remove the bearing seal and manually press grease into the bearings until they can take no more. When that has been done a new bearing seal must then be installed.

This procedure has a number of drawbacks. First, it is tedious and time-consuming. Second, it is a messy job. Third, the need to replace the bearing seal each time the bearings are repacked leads to extra costs.

Therefore, it is an object of this invention to provide a wheel bearing lubricator sleeve for lubricating inner wheel bearings which overcomes the drawbacks described above.

Another object of the invention is to provide a detachable wheel bearing lubricator sleeve that allows the bearings to be quickly and thoroughly repacked with grease without the need to remove the bearings from the hub or to remove the bearing seal from the hub.

Another object of the invention is to provide a wheel bearing lubricator sleeve that can be used in conjunction with an ordinary grease gun, thereby avoiding the need to pack the bearings by hand.

Another object of the invention is to provide a wheel bearing lubricator sleeve which can function with the bearing seal left in place, thereby avoiding the need to remove the seal or to use a new seal each time the bearings are repacked.

Another object of the invention is to describe a wheel bearing lubricator sleeve which requires no moving parts or complicated arrangements and which can be constructed inexpensively and function indefinitely.

SUMMARY OF THE INVENTION

The invention comprises a wheel bearing lubricator which is inserted into the inner bore of a wheel hub after it has been removed from the vehicle. A guide shaft on the device is dimensioned to have a diameter the same or slightly smaller than the axle shaft, thereby promoting a snug but rotatable fit. The guide shaft diameter may be slightly tapered to facilitate insertion of the device. A shoulder on the device allows it to be inserted into the inner bore of the wheel hub until it seats against the bearing seal. A sealing ring on the device is intermediate the shoulder and guide shaft. The device includes an angled passageway with a grease gun fitting at one end. After the device has been seated within the hub bore, a grease gun can be attached to the fitting and grease pumped into the passageway, the grease thereby flowing through the passage and into the bearings. The sealing ring and guide shaft prevent the grease from flowing to areas where it is not wanted. A handle on the device allows it to be inserted and removed easily, and to be rotated during the lubrication process to ensure that the grease is well distributed through the bearings.

DETAILED DESCRIPTION OF THE INVENTION

Figure 5:
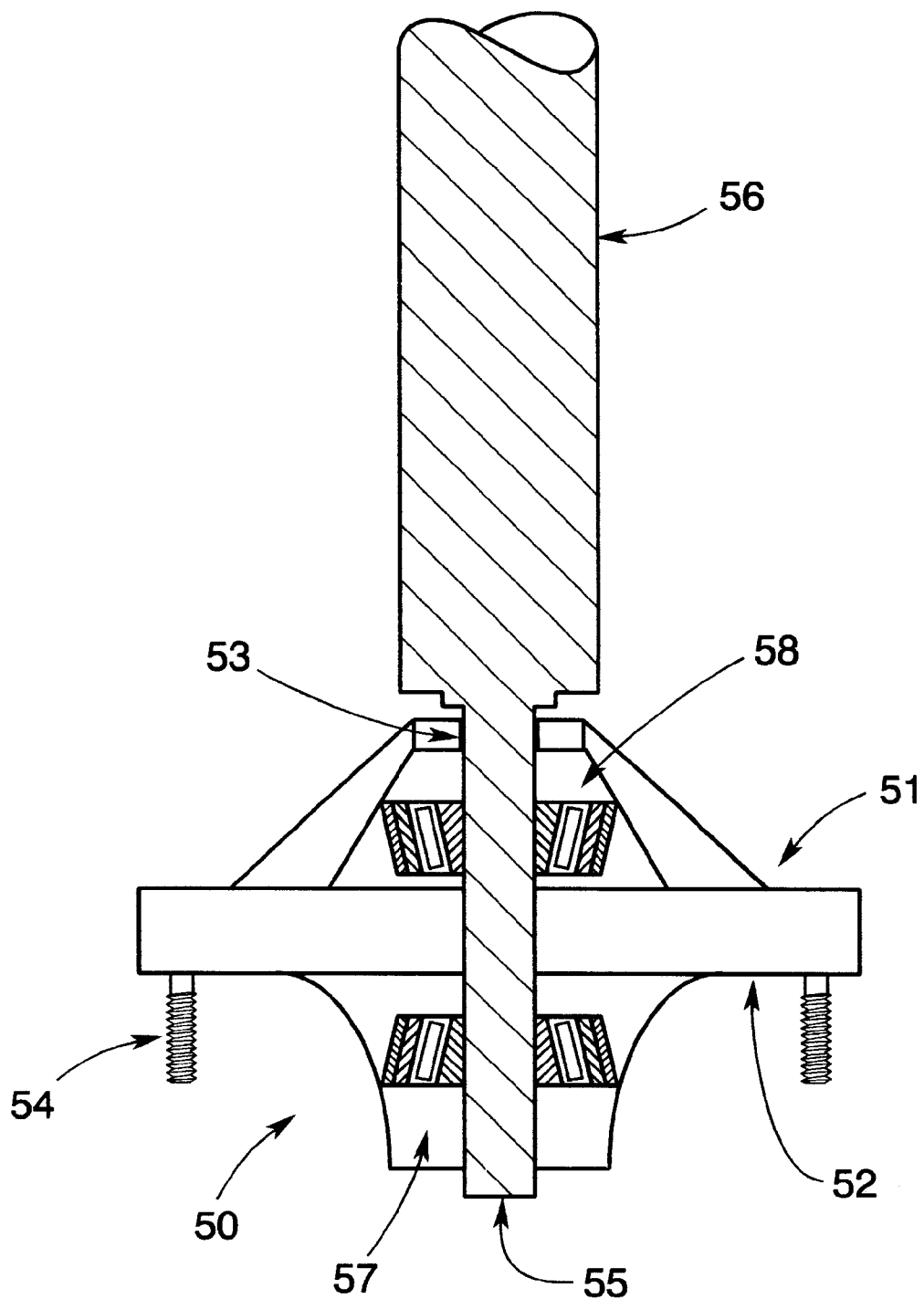
FIG. 5 is a simplified cross-sectional view of a typical wheel hub and axle assembly as commonly used in motor vehicles.

Referring first to FIG. 5 will assist in understanding the invention. FIG. 5 shows a simplified cross-section of a typical wheel hub and axle assembly as used on motor vehicles. Wheel hub 50 includes an inner face 51 and an outer face 52. Hub bore 53 cuts transversely through the wheel hub 50. A plurality of mounting bolts 54 protruding from the outer face 52 of the wheel hub 50 allow a wheel (not shown) to be mounted on the hub 50. An axle shaft 55, on the end of an axle 56, is sized to snugly fit within the hub bore 53. Outer bearings 57 and inner bearings 58 allow the wheel hub 50 to rotate freely about the axle shaft 55. A race 59 holds each set of bearings 57, 58 in place. A bearing seal 60 (see FIG. 3) covers the inner bearings 58 and protects against the unwanted entry of foreign material.

Figure 1:
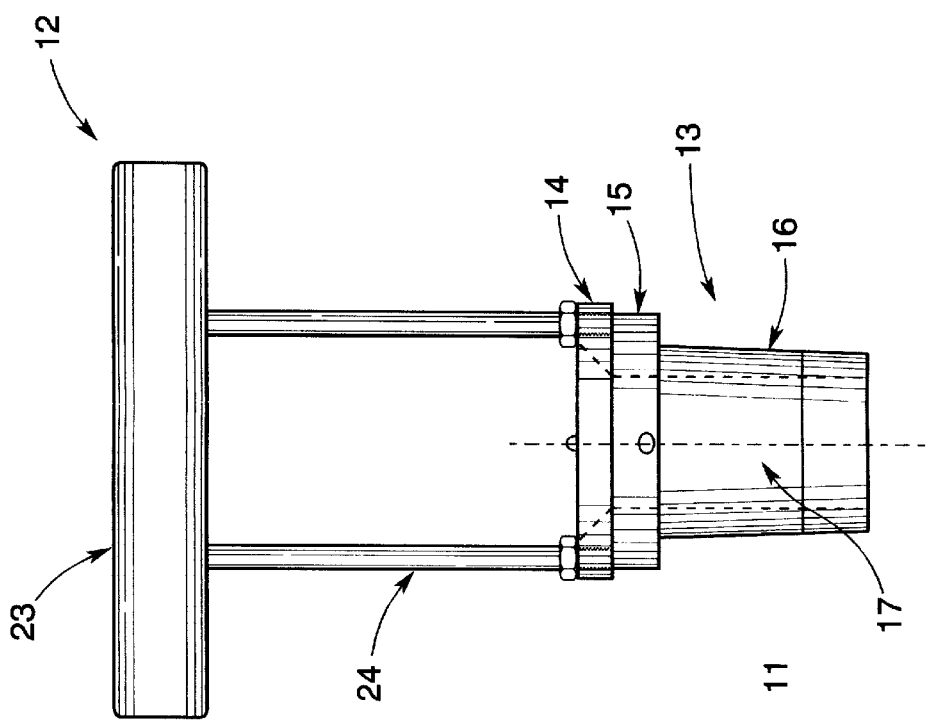
FIG. 1 is a side view showing the wheel bearing lubricator sleeve of the present invention.

Referring next to FIG. 1, the wheel bearing lubricator sleeve of the present invention, shown generally as 11, includes a handle 12 and a sleeve body 13. The sleeve body 13 is in the general shape of a hollow open-ended cylinder in three sections of varying diameters, a shoulder 14, a sealing ring 15, and a guide shaft 16, with the three sections encasing and defining a central bore 17. The end of the central bore 17 adjacent the shoulder 14 includes a chamfer 18. Since the three sections of the sleeve body are concentric and of varying outside diameters, the sleeve body 13 can be easily machined from a single piece. in the preferred embodiment the sleeve body 13 is a hollow open-ended cylinder in order to save weight and material. Alternative embodiments are also possible, such as a solid sleeve body 13, or one which is a hollow but close-ended cylinder. central bore 17. The end of the central bore 17 adjacent the shoulder 14 includes a chamfer 18. Since the three sections of the sleeve body are concentric and of varying diameters, the sleeve body 13 can be easily machined from a single piece. In the preferred embodiment the sleeve body 13 is a hollow open-ended cylinder in order to save weight and material. Alternative embodiments are also possible, such as a solid sleeve body 13, or one which is a hollow but close-ended cylinder.

Figure 2:
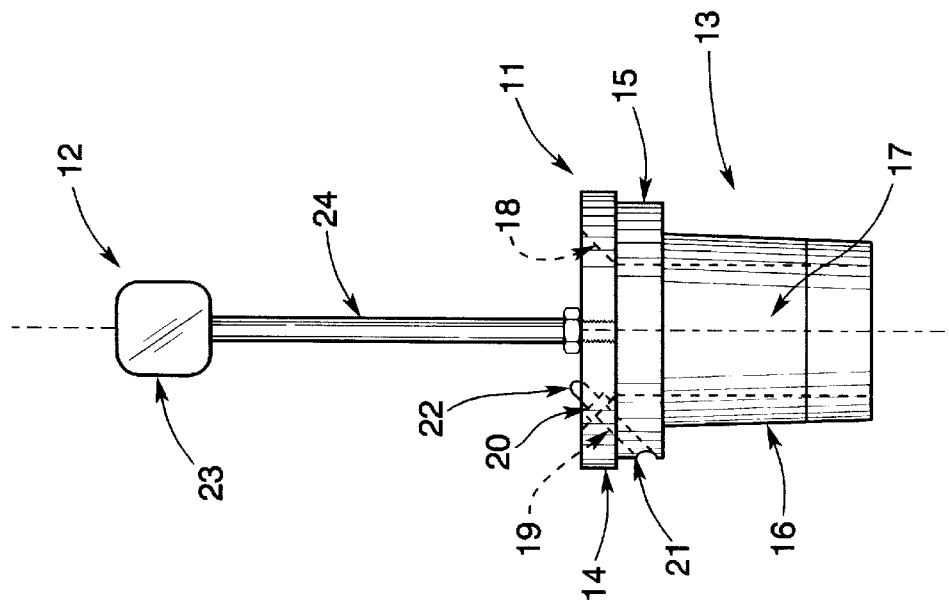
FIG. 2 is a side view rotated 90 degrees from FIG. 1 showing the wheel bearing lubricator sleeve of the present invention.

As best seen in FIG. 2, the sleeve body 13 includes an angular grease passage 19 which is angularly drilled from the chamfer 18 through the sealing ring 15, said grease passage 19 includes a grease entrance 20 and a grease exit 21. The grease passage 19 is tapped or otherwise fitted to allow a standard grease fitting 22 to be attached at the grease entrance 21.

The handle 12 in the preferred embodiment includes a grip bar 23 and two posts 24. The handle 12 is attached to the shoulder 14 by bolts, welds, or other suitable means.

Figure 3:
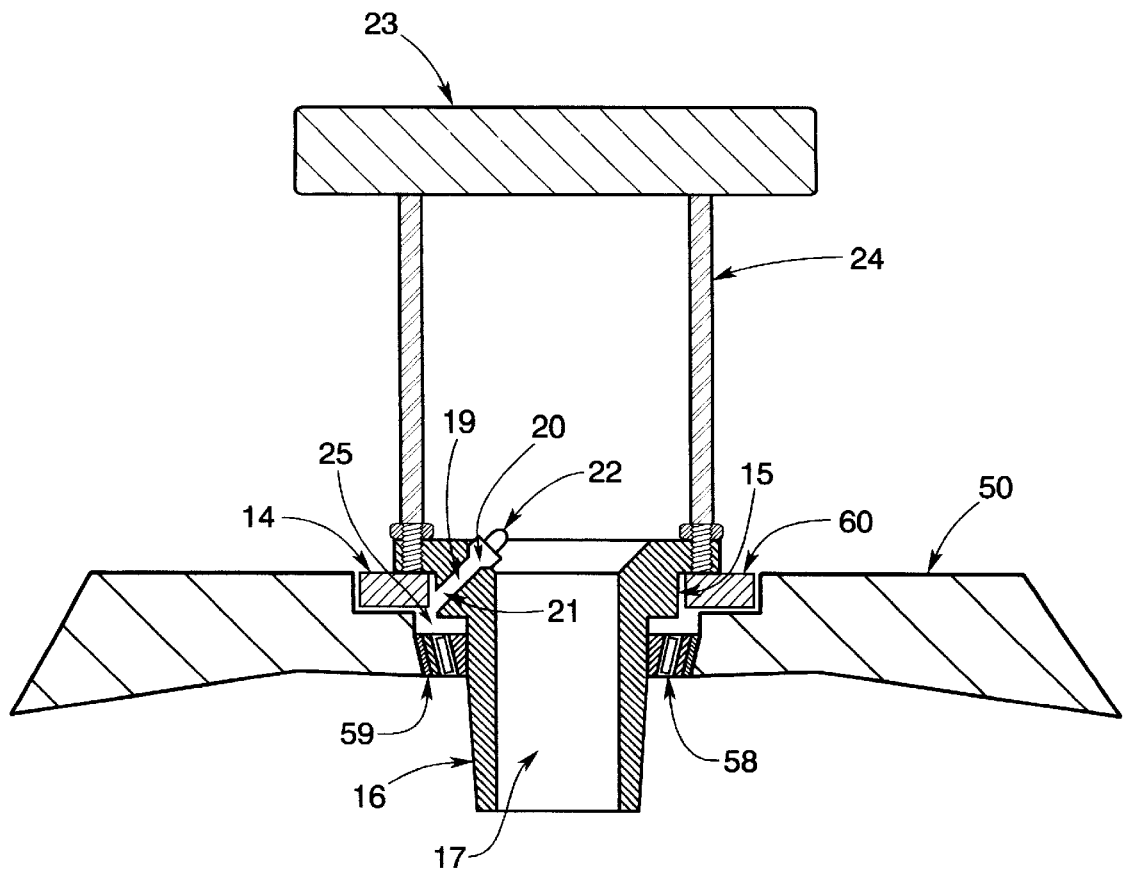
FIG. 3 is a cross-sectional view of the wheel bearing lubricator sleeve of the present invention shown as inserted into the bore of a wheel hub.

Referring now to FIG. 3, a cross-sectional view of the wheel-bearing lubricator sleeve 11 installed into a wheel hub 50 can be seen. After the wheel hub 50 has been removed from the vehicle, the sleeve body 13 of the wheel-bearing lubricator sleeve 11 is inserted into the hub bore 53, not separately identified on FIG. 3. The diameter of the guide shaft 16 is selected to closely or exactly correspond with the diameter of the axle shaft 55 which is normally in the wheel hub bore 53, thus providing a snug but rotatable fit. In the preferred embodiment, the guide shaft 16 slightly tapered, being widest where the guide shaft 16 meets the sealing ring 15. This slight taper makes it easier to insert the guide shaft 16 into the hub bore 53.

The travel of the wheel-bearing lubricator sleeve 11 into the hub bore 53 is restricted when the shoulder 14 comes into contact with the bearing seal 60. When the wheel-bearing lubricator sleeve 11 is thus seated, an annular chamber 25 is thereby formed, bounded by the bearing seal 60, the sealing ring 15, the inner bearings 58 and the wheel hub 50. As can be seen in the drawing, the grease passage 19 then communicates between the grease fitting 22 and annular chamber 25.

Figure 4:
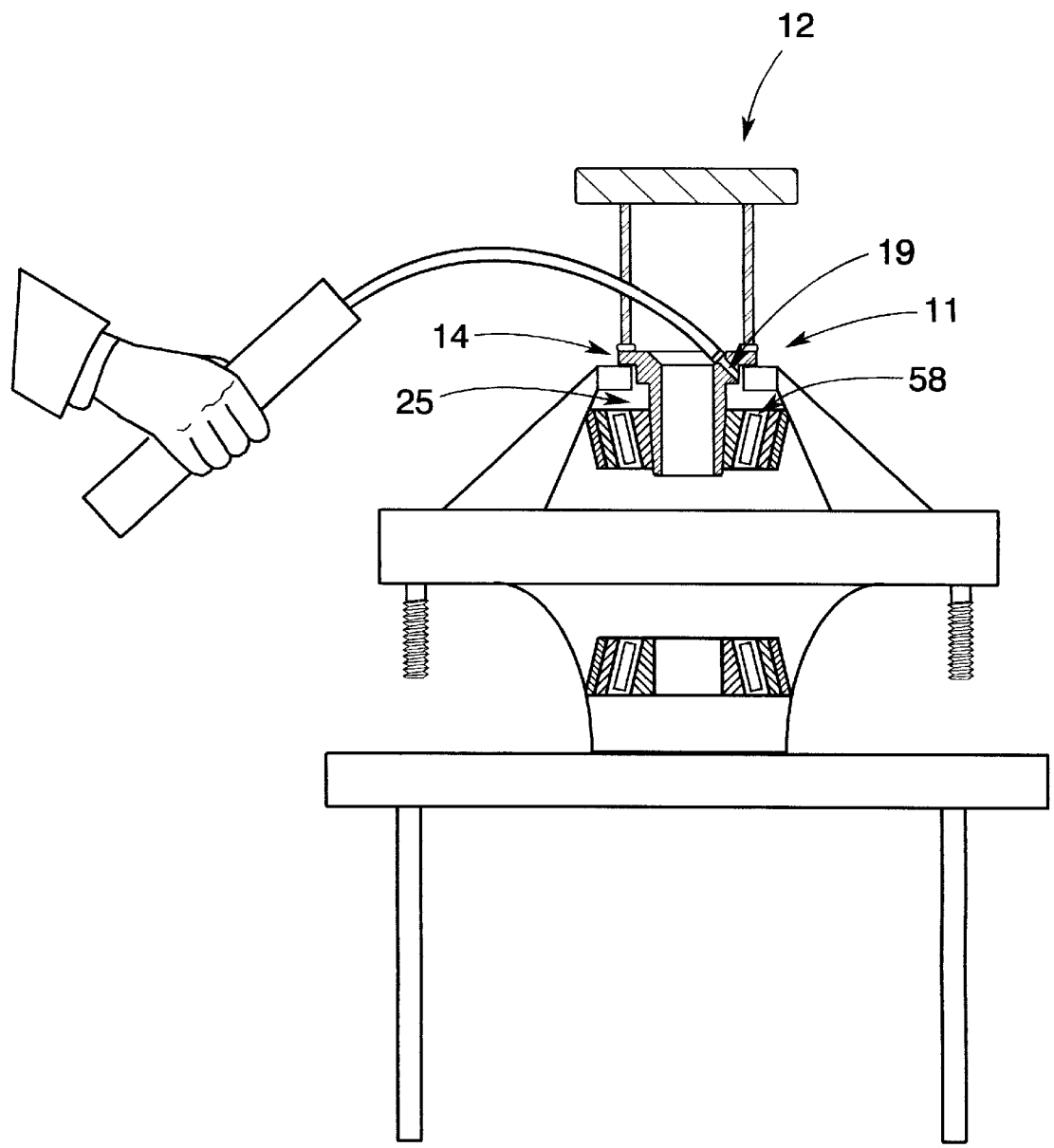
FIG. 4 is a stick-figure drawing showing the wheel-bearing lubricator sleeve of the present invention in use.

Referring now to FIG. 4, the use of the invention can be viewed. A wheel hub 50 has been removed from a vehicle and placed in a convenient spot. The wheel bearing lubricator sleeve 11 has been inserted into the hub bore 53 on the side with inner bearings 58. The user has attached a standard grease gun to the grease fitting 22. As the grease gun is pumped, grease is forced through the grease passage 19 and into the annular chamber 25. With nowhere else to go, the grease is forced into the inner bearings 58. By using the handle 12, the user can partially rotate the wheel bearing lubricator sleeve 11 periodically during the lubrication process to ensure that the grease is evenly distributed throughout the inner bearings 58. With a little practices the user can accurately gauge when and how much to rotate the wheel bearing lubricator sleeve 11 for best results. After the process has been completed, the wheel-bearing lubricator sleeve 11 can be easily withdrawn from the hub bore 53 by means of the handle 12 and the wheel hub 50 can be reinstalled on the vehicle.

By way of illustration only, and without intending to limit the scope of the invention in any way, applicant has through trial and error determined specific dimensions for the invention which work well with the Wilwood Starlight V hub. It must be kept in mind that the invention must be dimensioned to correspond with the applicable axle shaft 55, the placement of the bearing seal, and the thickness of the bearing seal, so these dimensions may need to be modified for use on different hubs and this can easily be done without departing from the spirit of the invention. The dimensions which applicant has found to work well are as follows:

| | |
|---|---|
| Shoulder | 3.00" diameter by .375" thickness |
| Sealing Ring | 2.375" diameter by .50" thickness |
| Guide Shaft | 2.010" to 1.960" diameter taper |
| Central Bore | 1.355" diameter |

Applicant has also found that aluminum functions well as a material for the invention, although there is no reason other metal or non-metal materials, or even combinations thereof, could not be used.

Although the invention has been described In its preferred embodiment with a certain degree of particularity, it should be understood that the present disclosure of the preferred form has been made only by way of example and that numerous changes in the details of construction and the combination and arrangement of parts may be done without departing from the spirit and scope of the invention. For instance, it would be possible, though not desirable to eliminate the handle 12, yet still have a functioning device.

Now that the invention has been described, what is claimed is:

1. A segmented one-piece apparatus for introducing grease into the inner bearings of a wheel hub within a hub bore, the apparatus comprising:

(a) an annular shoulder segment with an inside diameter and an outside diameter;

(b) an annular sealing ring segment with an inside diameter and an outside diameter, said inside diameter substantially the same as the inside diameter of the shoulder and said outside diameter smaller than the outside diameter of the shoulder;

(c) an annular guide shaft segment with an inside diameter and an outside diameter, said inside diameter substantially the same as the inside diameter of the shoulder and sealing ring and said outside diameter smaller than the outside diameter of the sealing ring, the shoulder, sealing ring, and guide shaft being in transverse sequence along an axial line and their inside diameters thereby forming a central bore; and an angular grease passage communicating between the inside diameter of the shoulder and the outside diameter of the sealing ring.

2. The apparatus of claim 1 further including a handle attached to the shoulder.

3. The apparatus of claim 2 wherein the inside diameter of the shoulder is chamfered.

4. The apparatus of claim 2 wherein the outside diameter of the guide shaft is tapered.

5. The apparatus of claim 4 wherein the outside diameter of the shoulder is approximately 3.00 inches, the outside diameter of the sealing ring is approximately 2.375 inches, the outside diameter of the guide shaft tapers from approximately 2.01 inches to 1.96 inches, and the diameter of the central bore is approximately 1.355 inches.

6. The apparatus of claim 2 further including a grease fitting attached to the angular grease passage at a shoulder end of said passage.

7. A method of greasing the inner bearings of a wheel hub within a hub bore on a motor vehicle comprising the steps of:
- (a) removing the hub from the motor vehicle;
- (b) inserting the guide shaft of the apparatus as described in claim 1 into into hub bore;
- (c) forcing grease into the angular grease passage in a desired amount such that it is transported through the said passage and into the inner bearings; and
- (d) removing the apparatus and replacing the hub.

* * * * *